US010996880B2

(12) United States Patent
Osada

(10) Patent No.: US 10,996,880 B2
(45) Date of Patent: May 4, 2021

(54) DATA COMMUNICATION SYSTEM DEVICE AND METHOD

(71) Applicant: CANON KABUSHIKI KAISHA, Tokyo (JP)

(72) Inventor: Mamoru Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/051,963

(22) Filed: Feb. 24, 2016

(65) Prior Publication Data
US 2016/0170680 A1 Jun. 16, 2016

Related U.S. Application Data

(63) Continuation of application No. 13/333,732, filed on Dec. 21, 2011, now Pat. No. 9,305,175, which is a
(Continued)

(30) Foreign Application Priority Data

Dec. 20, 2005 (JP) .............................. JP2005-366454

(51) Int. Cl.
G06F 21/62 (2013.01)
G06F 3/06 (2006.01)
G06F 21/60 (2013.01)

(52) U.S. Cl.
CPC ............ *G06F 3/0637* (2013.01); *G06F 3/067* (2013.01); *G06F 3/0622* (2013.01); *G06F 21/608* (2013.01); *G06F 21/6218* (2013.01)

(58) Field of Classification Search
CPC ...... G06F 3/0637; G06F 3/0622; G06F 3/067; G06F 21/6218; G06F 21/608
(Continued)

(56) References Cited

U.S. PATENT DOCUMENTS 6,535,932 B1 * 3/2003 Endoh .................. G06F 3/1204
710/7
7,443,527 B1 * 10/2008 Shigeeda ............. G06F 3/1204
358/1.13
(Continued)

FOREIGN PATENT DOCUMENTS

EP 1380935 A2 * 1/2004 ........... G06F 3/1204
WO 2004111806 A1 12/2004

OTHER PUBLICATIONS

"How to Run Long Jobs on the UNIX Systems", ISyE Helpdesk, [Online] Apr. 27, 2005, XP002429983, Georgia Tech College of Engineering. Article ID: 000056. Retrieved from the Internet on Mar. 11, 2019 from http://web.archive.org/web/20050427002306/http://www.isye.gatech.edu/helpdesk/index.php?x=&mod_id=2&id=56.

Primary Examiner — Thanhnga B Truong
Assistant Examiner — Angela R Holmes
(74) Attorney, Agent, or Firm — Canon U.S.A., Inc. I.P. Division

(57) ABSTRACT

A data communication device for storing image data input by scanning an original document in an external storage device includes a scanner, an inputting unit, a log-in processing unit, and a processing unit. The scanner scans an original document to input image data. The inputting unit inputs identification information. The log-in processing unit causes a user who is authenticated based on the input identification information to log into the data communication device. The processing unit performs data processing to store image data input by the scanner in an external storage device which is accessible based on the input identification information.

20 Claims, 16 Drawing Sheets

Related U.S. Application Data continuation of application No. 11/609,692, filed on Dec. 12, 2006, now Pat. No. 8,108,938.

(58) Field of Classification Search
USPC .......................................................... 726/27
See application file for complete search history.

(56) References Cited

U.S. PATENT DOCUMENTS

| | | | |
|---|---|---|---|
| 2002/0029269 A1* | 3/2002 | McCarty | H04L 63/0815 709/225 |
| 2003/0120729 A1* | 6/2003 | Kim | H04L 67/02 709/203 |
| 2003/0217103 A1* | 11/2003 | Yamamoto | H04N 1/2179 709/203 |
| 2005/0094195 A1* | 5/2005 | Sakamoto | G06F 21/33 358/1.15 |
| 2005/0138421 A1* | 6/2005 | Fedronic | G06Q 20/40975 726/4 |
| 2005/0172151 A1 | 8/2005 | Kodimer | |
| 2005/0243364 A1 | 11/2005 | Sakai | |
| 2006/0039038 A1* | 2/2006 | Wang | H04N 1/0096 358/451 |
| 2007/0143288 A1* | 6/2007 | Kichikawa | G06F 21/62 |
| 2015/0243364 A1 | 8/2015 | Tanzawa | |

\* cited by examiner

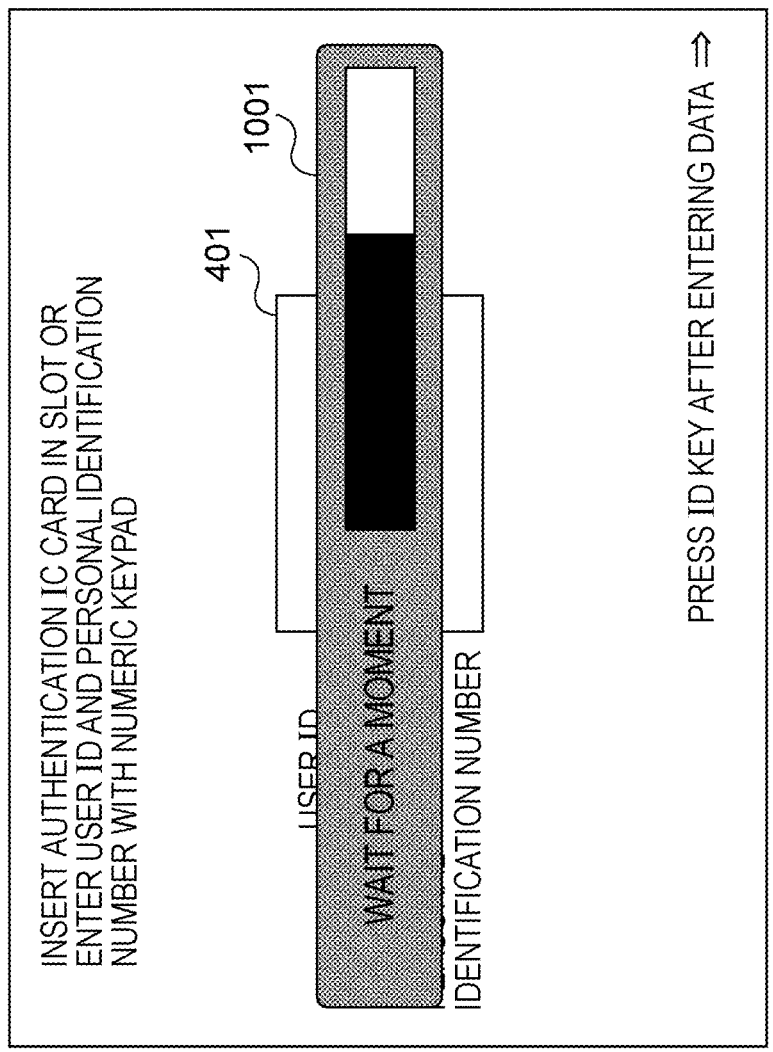

FIG. 16

| USER | LOCAL | DeviceA | DeviceB | DeviceC | ... |
|---|---|---|---|---|---|
| | 1601 | 1602 | 1603 | 1604 | |
| 0123 | BOX1 | BOX7 | ALL | BOX1 | |
| 5555 | BOX2 | FOLDER "DOCUMENT" | | FOLDER "DOCUMENT" | |
| | BOX3 | | | | |
| 8765 | BOX3 | FOLDER "DEPARTMENT NO. 1" | ALL | | |
| 0124 | BOX1 | BOX7 | ALL | BOX1 | |

DATA COMMUNICATION SYSTEM DEVICE AND METHOD

CROSS REFERENCE TO RELATED APPLICATIONS

The present application is a continuation of U.S. patent application Ser. No. 13/333,732, filed on Dec. 21, 2011, which is a continuation of U.S. patent application Ser. No. 11/609,692, filed on Dec. 12, 2006, which claims priority from Japanese Patent Application No. 2005-366454, filed Dec. 20, 2005, all of which are hereby incorporated by reference herein in their entirety.

BACKGROUND OF THE INVENTION

Field of the Invention

The present invention relates particularly, though not exclusively, to a data communication device, a data communication system, and a data communication method in which storage areas of storage devices connected via networks to the data communication device and the data communication system can be accessed.

Description of the Related Art

Recently, the number of systems in which data processing devices such as personal computers (PCs) or multi functional printers are shared among a plurality of users has increased. The background to this may be that many recent data processing devices include high-capacity storage devices, and thus, even when the data processing devices are shared among a plurality of users, each user can store the user's own data in the data processing devices. Accordingly, a type of data processing device has come into use, which has a user authentication function to ensure security of data stored in the data processing device. In many cases, a user identification (ID) and a corresponding password are input, or an integrated circuit (IC) card on which user information is recorded is used for user authentication. Thus, log in and log out operations can be easily performed when the data processing device is used.

Recently, a type of system has come into use, to which a plurality of data processing devices are connected via a network. For example, a plurality of data processing devices are connected to a system via a local area network (LAN), such as a company LAN or a home LAN, or the Internet.

In these environments, a user may operate one data processing device to access data stored in another data processing device to which the one data processing device is connected via a network. For example, the user can submit an instruction to move data stored in one data processing device to a storage area of another data processing device. Moreover, a user can readily move data stored in one data processing device operated by the user or data input by scanning an original document using a scanner provided in the one data processing device to a storage area of another data processing device.

When access to storage areas of data processing devices on networks is facilitated in this way, a problem of security occurs. That is to say, when any user can access data stored in data processing devices on networks, confidentiality of data cannot be secured.

Thus, when data processing devices or storage areas to be accessed via networks are shared among a plurality of users, in addition to authentication of the users, who operate the data processing devices, access rights to the data processing devices or the storage areas need to be assigned to the individual users. Items of data that can be accessed by users can be restricted by determining data processing devices or storage areas that can be accessed via networks by individual users, authenticated by a user authentication function. In this arrangement, only authorized users can access the individual items of data via networks to update or move the items of data.

For example, a data communication system is disclosed in Japanese Patent Laid-Open No. 2001-188699, in which data is shared among a plurality of users via networks and access to the shared data is controlled for each user. Such a system is currently used in intranets, LANs, or the like.

However, a problem may occur when a user operates one data processing device to process data stored in a storage area of another data processing device to which the first data processing device is connected via a network. For example, the user first operates the one data processing device to log in the other data processing device to access the other data processing device and the storage area. In this situation, when the user logs out of the one data processing device while the data is being processed using the storage area, data processing is aborted at that point, as shown in FIG. 9A.

The term "log in" shown in FIG. 9A means that the user is put in a status in which the user can submit an instruction to perform processing using functions of the one data processing device. The term "log out" shown in FIG. 9A means that the user is put in a status in which the user cannot submit the instruction. The term "enable access" means that access to the storage area in a network is enabled. The term "disable access" means that access to the storage area is disabled.

Thus, in the known art, the user needs to keep logging into the one data processing device until processing of the data in the storage area of the other data processing device is completed, so that data processing is not aborted. Accordingly, the user, who operates the one data processing device, needs to wait for completion of data processing in the other data processing device to log out of the one data processing device. In this situation, the user needs to attend the one data processing device until data processing is completed. Thus, the operation is inefficient, because when the amount of data to be processed is large, a long period of time is necessary before the user can log out of the one data processing device after data processing is started.

SUMMARY OF THE INVENTION

The present invention was made in view of the aforementioned problems and provides a data communication device, a data communication system, and a data communication method, in which, when data stored in a storage device connected via a network is processed, a logged-in user can perform a log-out operation before data processing is completed, and the ongoing data processing can be appropriately completed.

According to an embodiment of the present invention, a data communication device for storing image data input by scanning an original document in an external storage device includes a scanner configured to scan an original document to input image data, an inputting unit configured to input identification information, a log-in processing unit configured to cause a user who is authenticated based on the input identification information to log into the data communication device, and a processing unit configured to perform data processing to store image data input by the scanner in an external storage device which is accessible based on the input identification information.

Further features of the present invention will become apparent from the following description of exemplary embodiments with reference to the attached drawings.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 10 shows a screen that appears in the first exemplary embodiment during a period between the time when a user logs out of the multi functional printer and the time when data processing is completed.

FIG. 16 shows an identification information table according to the exemplary embodiments.

DESCRIPTION OF THE EMBODIMENTS

Exemplary embodiments according to the present invention will now be described.

First Exemplary Embodiment

Figure 1:
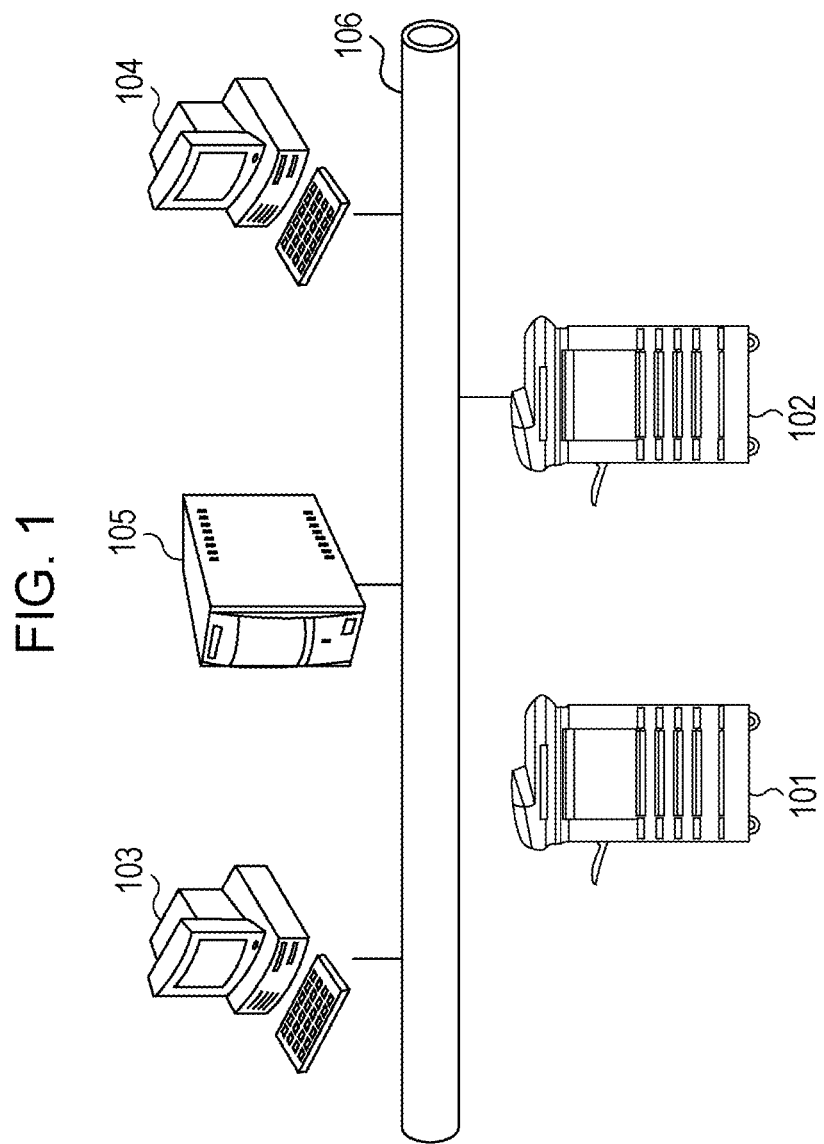
FIG. 1 is a block diagram of a general system in which multi functional printers according to exemplary embodiments are used.

FIG. 1 is a block diagram of a general system in which multi functional printers according to the present invention are used. For example, multi functional printers 101 and 102 can print or store image data obtained by scanning an original document or can send the image data to external devices.

A personal computer (PC) 103 can generate print data and cause the multi functional printers 101 and 102 to print the print data. The PC 103 and a server 105 can receive and store the image data input by scanning the original document by the multi functional printers 101 and 102.

A LAN 106 is a network to which the multi functional printers 101 and 102, the PC 103, an authentication server 104, and the server 105 are connected. The PC 103, the authentication server 104, and the server 105 can be accessed from the multi functional printers 101 and 102 via the LAN 106. Any connection medium can be used to establish connection, which enables duplex communication. Any known protocol may be used for data transfer between these components, for example, the Hyper Text Transfer Protocol (HTTP) or the File Transfer Protocol (FTP). Alternatively, a user-specific application protocol may be used.

In the first exemplary embodiment, IC card readers for personal authentication are individually connected to the multi functional printers 101 and 102, the PC 103, the authentication server 104, and the server 105. Each IC card reader reads identification information stored in an IC card and sends the identification information to the authentication server 104. When the authentication server 104 determines by comparing the received identification information with corresponding identification information that is registered in advance that these pieces of identification information coincide with each other, a corresponding user can use a device to which the IC card reader is connected. Verification of identification information need not be performed by the authentication server 104 on the network, and a verification unit may be provided in each device and perform verification of identification information as an alternative.

The PC 103 and the server 105 include a plurality of storage areas. Access rights to individual storage areas can be assigned to different users. Each user is authenticated on the basis of user input identification information and can access a storage area that is set in advance so that the user can access the storage area. Then, the user can, for example, browse, update, and retrieve data stored in the storage area.

Figure 2:
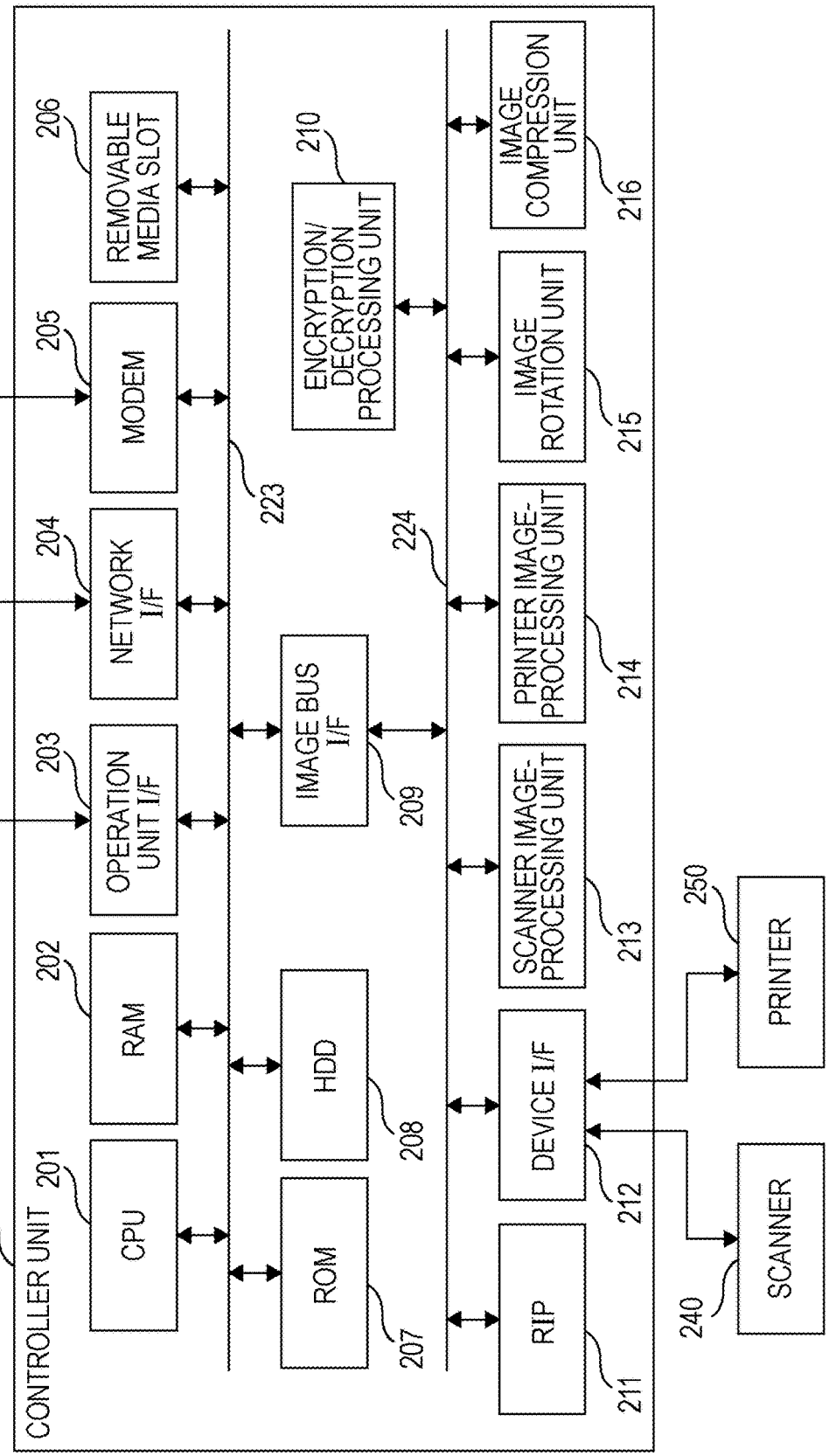
FIG. 2 is a system block diagram of a multi functional printer according to a first exemplary embodiment.

FIG. 2 is a system block diagram of the multi functional printer 101 according to the first exemplary embodiment. A controller unit 200 is connected to a scanner 240 that is an image input device, and a printer 250 that is an image output device, and controls input and output of image data and the like. Moreover, the controller unit 200 is connected to a LAN 221 and a wide area network (WAN) (a public circuit) 222 and controls communication of various types of data and device data.

A central processing unit (CPU) 201 functions as a controller that performs overall control of the system. A random access memory (RAM) 202 functions as a system work memory for the CPU 201 to operate, a memory for temporarily storing various types of data, and a work memory on which various types of application are executed. A read only memory (ROM) 207 is a boot ROM in which a boot program of the system is stored.

A hard disk drive (HDD) 208 stores system software, various types of data, various types of application, various types of history of jobs that are processed in the multi functional printer 101, and the like. The HDD 208 can be accessed from other devices on the network via a network interface (I/F) 204 described below. Moreover, the HDD 208 stores program code that performs a process, for example, shown in the flowcharts described below. The CPU 201 loads the program code into the RAM 202 to perform process control according to the flowchart.

An operation unit I/F 203 is an interface with an operation unit 230 that includes a touch panel and outputs display data to be displayed on the operation unit 230 to the operation unit 230. The operation unit I/F 203 also sends the CPU 201 instructions input from the operation unit 230 by the user.

The network I/F 204 is connected to the LAN 221 (corresponding to the LAN 106 shown in FIG. 1) and inputs and outputs various types of data. A modulator-demodulator (MODEM) 205 is connected to the WAN 222 and inputs and outputs facsimile data. The aforementioned components are placed on a system bus 223.

An image bus I/F 209 is a bus bridge that connects the system bus 223 to a bus 224 for rapidly transferring image data and the like and converts data structures. The bus 224 includes a Peripheral Component Interconnect (PCI) bus, an Institute of Electrical and Electronics Engineers (IEEE) 1394 bus, etc.

The following devices are placed on the bus 224: a raster image processor (RIP) 211, a device I/F 212, a scanner image-processing unit 213, a printer image-processing unit 214, an image rotation unit 215, an image compression unit 216, and an encryption/decryption processing unit 210. The RIP 211 generates a bitmap image from Page Description Language (PDL) code received from, for example, the PC 103. The device I/F 212 connects the scanner 240, the printer 250, and the like to the controller unit 200.

The scanner image-processing unit 213 corrects, processes, and edits scan data input from the scanner 240. The printer image-processing unit 214 performs, for example, correction and resolution conversion of an image represented by print data to be output to the printer 250. The image rotation unit 215 rotates an image. The image compression unit 216 compresses multi-level image data using, for example, the Joint Photographic Experts Group (JPEG) method and compresses bi-level image data using, for example, the Joint Bi-level Image experts Group (JBIG) method, the Modified Modified Read (MMR) method, or the Modified Huffman (MH) method. The image compression unit 216 also decompresses compressed image data.

A removable media slot 206 is a slot in which a removable data storage medium, such as a memory card, can be inserted. The removable media slot 206 can store and read image data and the like in and from the removable data storage medium. In the first exemplary embodiment, an IC card for user authentication is used. The encryption/decryption processing unit 210 encrypts and decrypts data using a predetermined encryption key.

A storage medium used for user authentication may be the aforementioned IC card or a magnetic card. Alternatively, a storage medium need not be used for user authentication, and user authentication may as an alternative be performed on the basis of a user ID and a corresponding personal identification number that are input from the operation unit 230 by a user. The structure of the multi functional printer 102 is similar to the structure of the multi functional printer 101.

Figure 3:
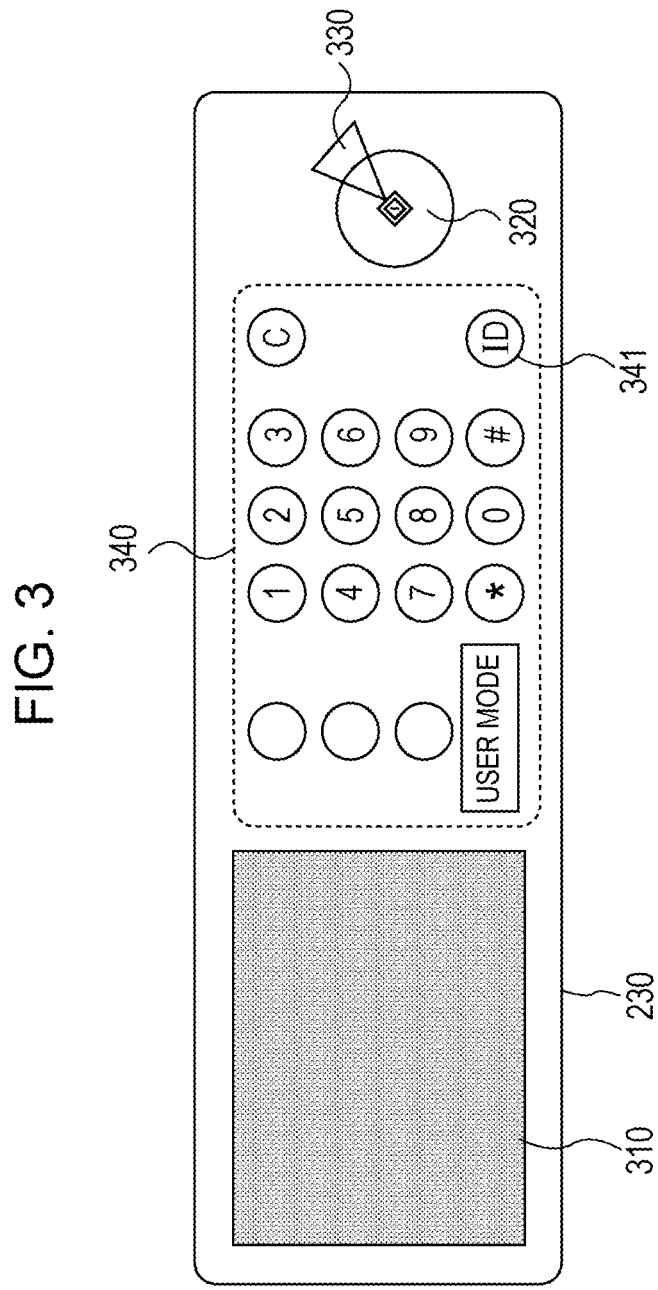
FIG. 3 is an overall view of an operation unit in the multi functional printer according to the first exemplary embodiment.

FIG. 3 is an overall view of the operation unit 230 in the multi functional printer 101 according to the first exemplary embodiment. A liquid crystal display (LCD) unit 310 includes an LCD to which a touch panel sheet is attached and displays a system operation screen. When one of the displayed keys is pressed, the LCD unit 310 sends the positional information to the CPU 201.

A start key 320 is used to, for example, start to read an original document image and start various types of data processing. A light emitting diode (LED) having two colors of green and red is provided in the central area of the start key 320, and the color of the LED indicates whether the start key 320 is in a status in which the start key 320 can be used. A stop key 330 stops operation in process.

A hardkey group 340 includes a numeric keypad, a clear key, a reset key, a guide key, a user-mode key, an ID key 341, and the like. The ID key 341 is used by a user inputting user identification information to log into the multi functional printer 101. When the user presses the ID key 341 while logged into the multi functional printer 101, the user logs out of the multi functional printer 101. The reset key is used to reset various types of settings input from the operation unit 230.

Figure 4:
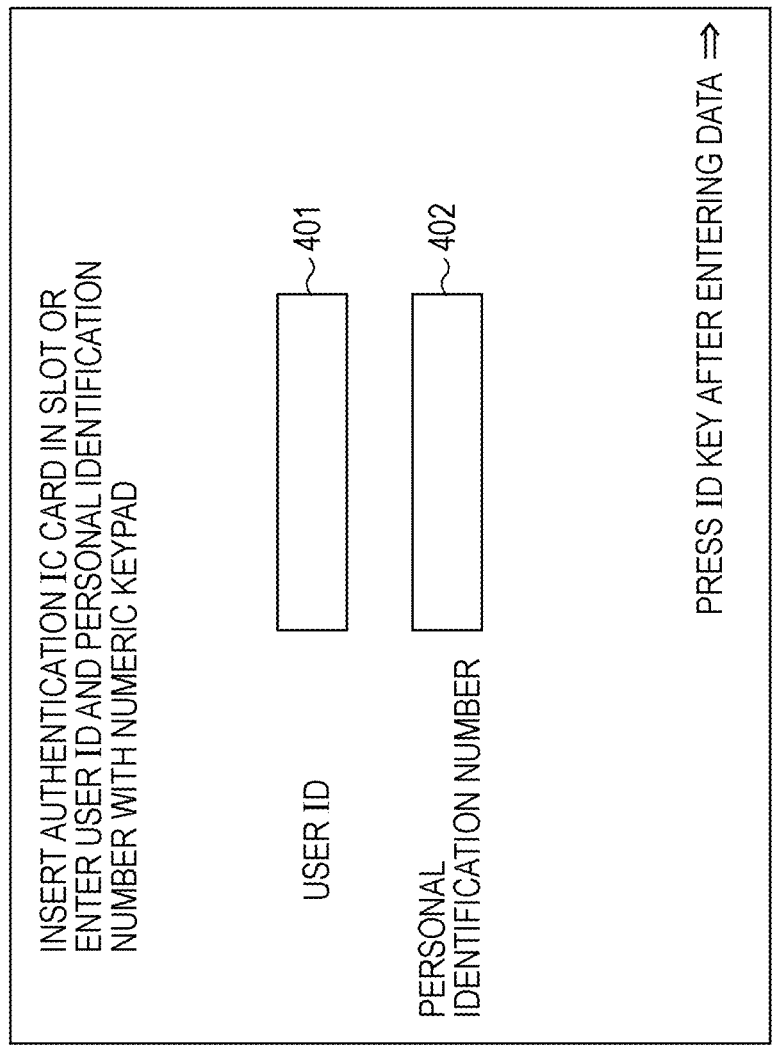
FIG. 4 shows a user authentication screen according to the first exemplary embodiment.

FIG. 4 shows an operation screen for user authentication, in the initial state, that appears on the LCD unit 310 in FIG. 3. In the first exemplary embodiment, user authentication is performed using identification information stored in an IC card, or a user ID and a corresponding personal identification number that are input from the operation unit 230 by the user. A personal identification number is not limited to numerical characters, and alphabetical characters or symbols may be used as a personal identification number.

Specifically, in a case where an IC card is used, when the IC card, which stores identification information for authenticating the user, is inserted in the removable media slot 206, the identification information stored in the IC card is read and sent to the authentication server 104. In a case where user authentication is performed using a user ID and a corresponding personal identification number, when the user presses the ID key 341 after entering necessary data in a user-ID input field 401 and a personal-identification-number input field 402, the user ID and the corresponding personal identification number are sent to the authentication server 104 as user identification information.

The authentication server 104 compares the received identification information with a plurality of pieces of identification information registered in advance. It is determined whether the received identification information is the same as any one of the plurality of pieces of registered identification information. When it is determined that the received identification information is the same as one of the plurality of pieces of registered identification information, the user is allowed to log in the multi functional printer 101. Otherwise, the user is not allowed to log in the multi functional printer 101.

FIG. 16 shows an identification information table stored in the authentication server 104. Pieces of identification information for identifying users and corresponding pieces of area identification information defining storage areas that can be accessed by the individual users (fields 1601 to 1604) are managed in the identification information table, as shown in the drawing. Pieces of information for identifying storage areas set in the HDD 208 are input in the field 1601. Pieces of information for identifying external storage areas connected to the multi functional printer 101 via the network (the LAN 221) are input in the fields 1602 to 1604.

For example, "0123" is entered as a user ID. In this case, a user 0123 is registered in the identification information table in the drawing. Thus, when a corresponding personal identification number that is entered at the same time coincides with that set for the user 0123, the user can log in the multi functional printer 101. In the identification information table, BOX1 in the HDD 208, BOX7 in DeviceA, all storage areas in DeviceB, and BOX1 in DeviceC are registered as storage areas that can be accessed by the user 0123, who logs into the multi functional printer 101. In the first exemplary embodiment, a user ID and a corresponding personal identification number that are respectively entered in the user-ID input field 401 and the personal-identification-number input field 402 in FIG. 4 are sent to the authentication server 104, and the authentication server 104 verifies the user ID and the corresponding personal identification number. When the user ID and the corresponding personal identification number coincide with those registered in advance the user can log in and receive information showing storage areas that can be accessed by the user from the authentication server 104. The content of the identification information table may be automatically updated in synchronization with an update operation in each device.

When user authentication is performed by a verification unit provided in a terminal operated by a user instead of the authentication server 104, the verification unit includes the identification information table. In the aforementioned method for user authentication, a user ID and a corresponding personal identification number are input from the operation unit 230, or a contact IC card is used. Alternatively, for example, a non-contact IC card or fingerprint authentication may be adopted.

Figure 5:
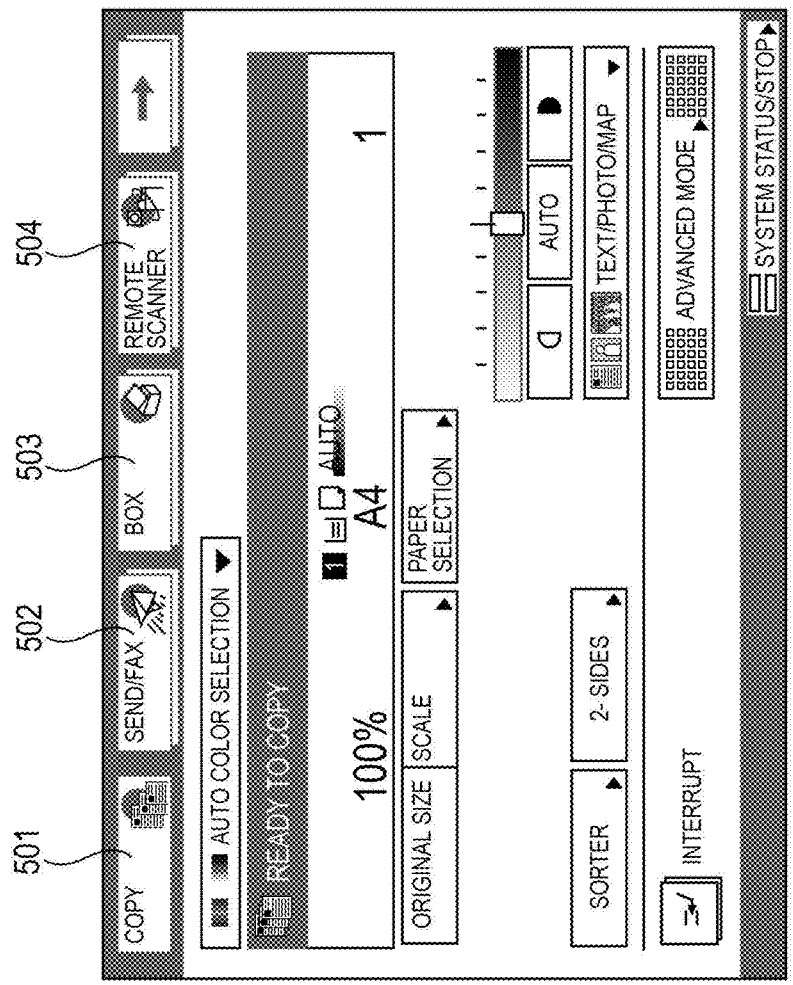
FIG. 5 shows a copy main screen according to the first exemplary embodiment.

FIG. 5 shows a copy main screen that appears on the operation unit 230 when a user has been authenticated by the aforementioned operation and logged into the multi functional printer 101. The multi functional printer 101 according to the first exemplary embodiment has four main functions of copy, send/facsimile, box, and remote scanner. These four functions correspond to four main tabs 501 to 504 that appear on the top of the operation screen shown in FIG. 5. When each of the main tabs 501 to 504 is selected, a screen of the corresponding function appears.

The copy function performs local copy using the scanner 240 or the printer 250. The send/facsimile function sends image data by electronic mail (e-mail), a facsimile, or file transfer, stores image data in a box, or transfers image data to a database. In this function, a plurality of destinations can be specified.

The box function stores data read by the scanner 240, data received by a facsimile, or data generated from PDL data received from the PC 103 or the like in a predetermined storage area (a box). This function can further, for example, preview, combine, insert, move, or erase data stored in a box. The remote scanner function causes the scanner 240 to read data and send the read data to an external device connected to the multi functional printer 101 via networks in response to an instruction from the external device.

When the start key 320 is pressed after settings related to the copy function, for example, the scale, the number copies, and paper size, are configured on the copy main screen shown in FIG. 5, copying operation is started. The configuration of the copy main screen, the initial settings on the copy main screen, or the like can be customized for individual users.

Figure 6:
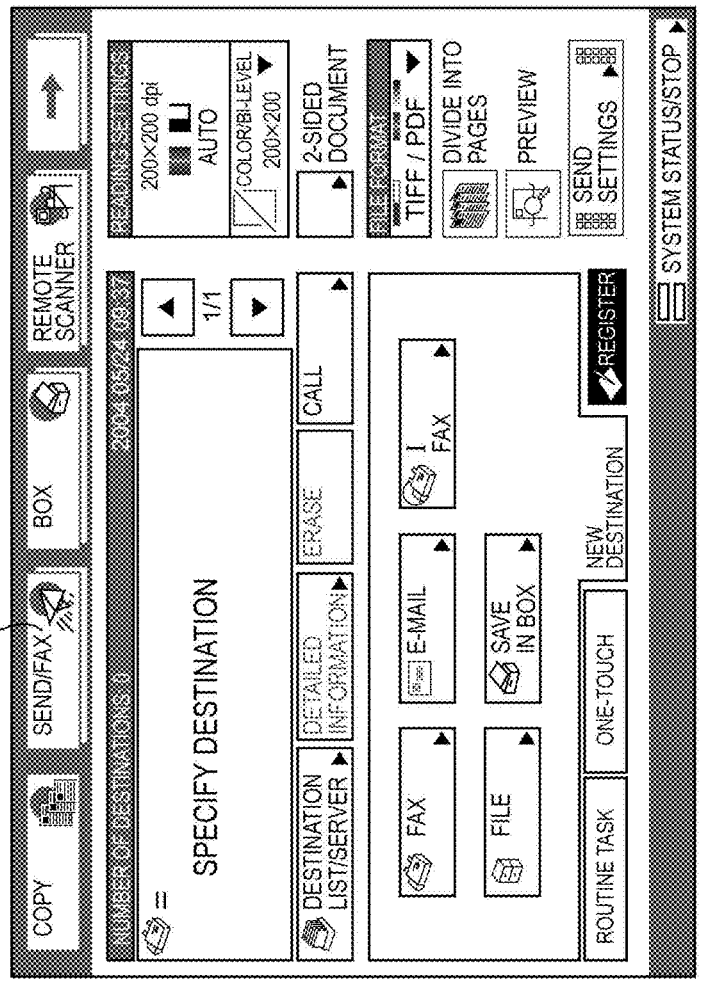
FIG. 6 shows a send/facsimile main screen according to the first exemplary embodiment.

FIG. 6 shows a send/facsimile main screen that appears when the main tab 502 is selected. When the start key 320 is pressed after settings (for example, a transmission method, a transmission destination, and reading settings for a document to be sent) are configured on this screen, a document is read by the scanner 240 and a transmission operation is started.

Figure 7:
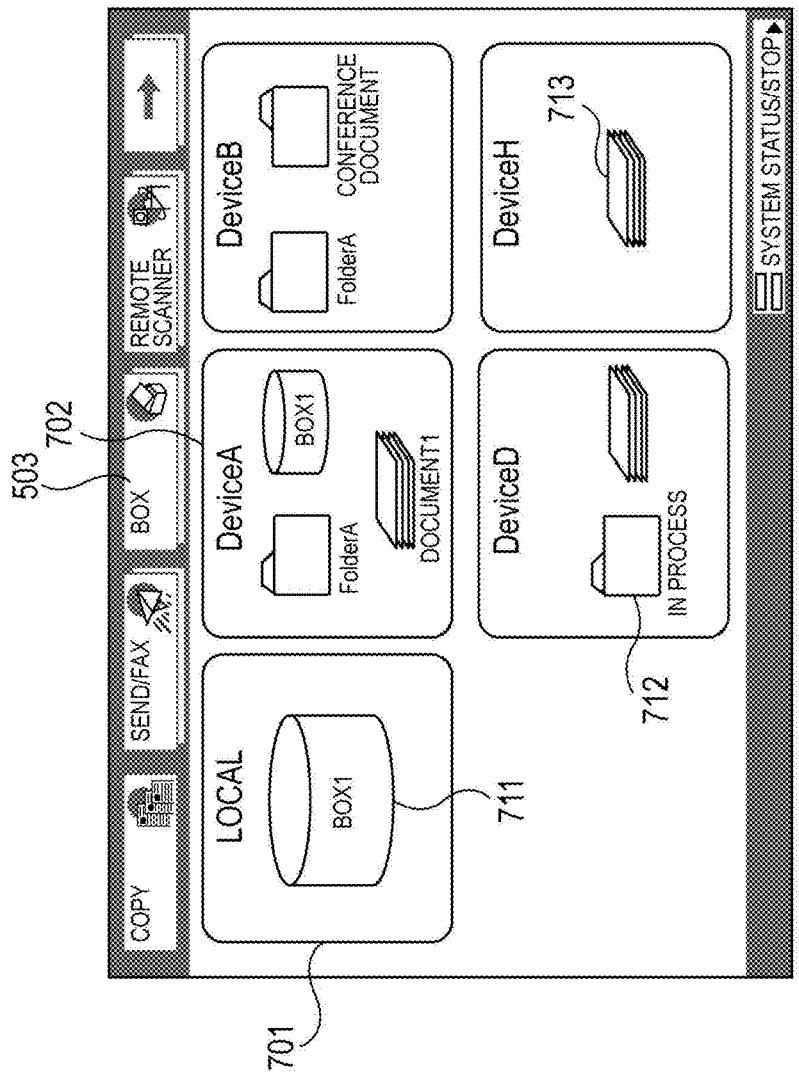
FIG. 7 shows a box main screen according to the first exemplary embodiment.

FIG. 7 shows a box main screen that appears when the main tab 503 is selected. A list is displayed on this screen. The list includes storage areas, boxes, folders, and files in the HDD 208 and the external devices associated with a user who has logged into the multi functional printer 101 on the screen shown in FIG. 4. The storage areas, the boxes, the folders, and the files are set in advance so that they can be accessed by the user. Specifically, information for identifying storage areas is obtained from the authentication server 104 (or the multi functional printer 101), the storage areas being associated with a user ID that is used when a user is authenticated to log on the multi functional printer 101. Then, the CPU 201 accesses the access areas on the basis of the obtained information. The term "box" represents a storage area that is allocated in a storage device in the initial state, and the term "folder" represents a storage area that can be freely created by a user in a desired storage area.

A list of boxes, folders, and files that can be accessed by the logged-in user or attribute information (for example, a file name) is received from each external device (a storage device) in advance. Then, when the main tab 503 is selected, boxes, folders, and files are displayed in a list format, as shown in FIG. 7. Each storage device, each box, and each folder are assigned to users who can access the storage device, the box, and the folder. Thus, even when a user can access a box, the user may not be allowed to access a folder set in the box. In this case, the user can access only files stored in the box, not in the folder.

A piece of data is displayed in an area 701 on the screen shown in FIG. 7, which is stored in a local storage area, i.e., an area that can be accessed by the user, who is currently logged into the multi functional printer 101, in the storage area of the HDD 208. The status in which an icon 711 is displayed means that the user can access a box named BOX1.

An area 702 represents a storage area of an external device named DeviceA, for example, the PC 103 or the multi functional printer 102, connected to the multi functional printer 101 via the network. When there is no area in a storage area of an external device that can be accessed by the user, or when a communication error occurs in the network, only the storage area of LOCAL is displayed.

In FIG. 7, FolderA, BOX1, and DOCUMENT1 are displayed in the area 702 for DeviceA. That is to say, since the user can access DeviceA, the user can access DOCUMENT1, which is a file stored not in the box and the folder but in DeviceA. Moreover, since the user can access FolderA and BOX1, corresponding icons are displayed, and the user can access files stored in the storage areas of FolderA and BOX1, as described below with reference to FIG. 8. Another box BOX2 set in DeviceA is not shown because BOX2 is not set so that the user can access BOX2.

In the drawing, a box, a folder, or the like are displayed in each storage area in a hierarchical format so that the user can readily recognize their places. Alternatively, another display method may be adopted. For example, all files that can be accessed by the logged-in user out of the files stored in DeviceA may be displayed in a list format. Moreover, a top screen like that shown in FIG. 7 may not be displayed every time the user logs into the multi functional printer 101, but a screen that was displayed when the user logged out of the multi functional printer 101 the last time may be displayed. Moreover, the user may freely customize the configuration of a screen that appears when the user logs into the multi functional printer 101.

Figure 8:
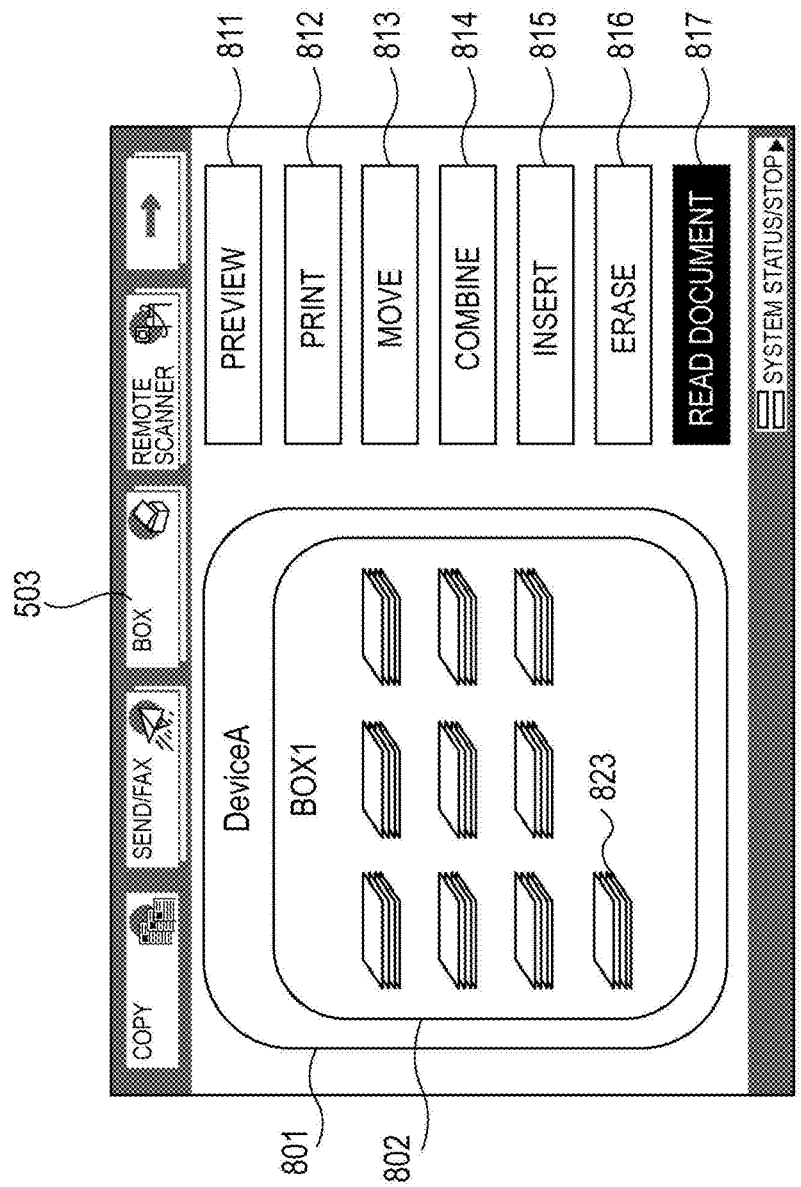
FIG. 8 shows a box details screen according to the first exemplary embodiment.

FIG. 8 shows a detailed screen that shows the content of one of the areas, including the areas 701 and 702 shown in FIG. 7, when the user selects the area. In this case, a list of pieces of data stored in BOX1 in the area 702 in FIG. 7 is displayed. The user can select various types of processing of the pieces of data in the list on this screen. Specifically, when the user presses one of buttons 811 to 817 corresponding to a user-desired type of processing after selecting at least one of the pieces of data in the list, the selected type of data processing is started.

When the user presses the preview button 811, a preview image of the selected piece of data is received from DeviceA via the LAN 221 to be displayed on the LCD unit 310. When the user presses the print button 812, a detailed print settings screen appears. Then, the user sends DeviceA an instruction to output the selected piece of data to a device as a print job after specifying the device together with the number of copies, the paper size, the type of finishing, and the like. When the user presses the move button 813, a detailed move settings screen appears. The user can move or copy the selected piece of data to a user-desired storage area on this screen. When an arrangement is adopted, in which data can be moved by dragging and dropping a corresponding icon onto a user-desired storage area on the screen shown in FIG. 7, the user can submit an instruction to move data by a simplified operation.

When the user presses the combine button 814, a detailed combine settings screen appears. The user can combine the selected two or more pieces of data on this screen. When the user presses the insert button 815, a detailed insert settings screen appears. The user can insert the selected piece of data on this screen. When the user presses the erase button 816, the selected piece of data is erased.

When the user presses the read document button 817 if a folder or a box is selected, a detailed document read settings screen appears. On this screen, the user can cause the scanner 240 to read a document after configuring detailed settings on document reading (for example, the paper size and the resolution), send the scan data to DeviceA, and store the scan data in the selected folder or box.

The execution of the aforementioned various types of processing corresponding to the buttons 811 to 817 may be restricted for each log-in user in a manner that depends on storage areas that are set so that the log-in user can access the storage areas. For example, a user who has the authority to perform only a viewing operation may be permitted to perform only a preview operation and print operation, and a user who has the authority to perform editing operation may be permitted to perform a move operation, a combine operation, and an insert operation in addition to a preview operation and print operation. In this arrangement, data can be shared among a plurality of users while a higher security level is achieved.

The aforementioned various types of processing involve communication via the LAN 221. Thus, it may take a long time to complete processing for some types of data to be processed and some types of processing. For example, it takes a short time to erase a small amount of data. However, it may take a long time to move a large amount of data. Moreover, when data scanned by the multi functional printer 101 is stored in an external storage area, it may take a long time to perform reading operation and data transmission.

Figure 9A:
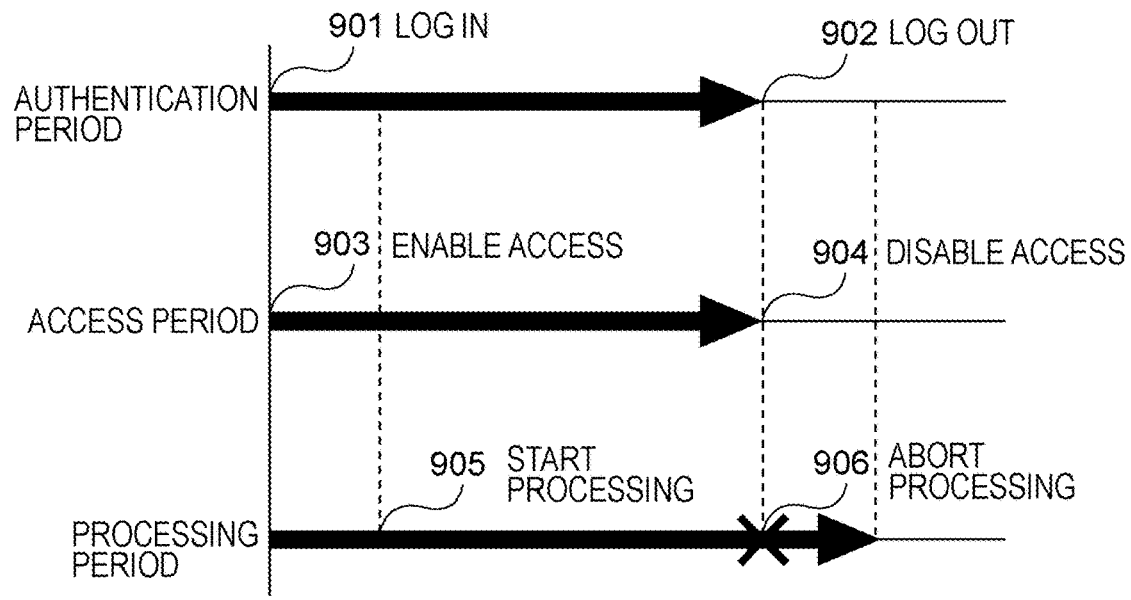
FIGS. 9A and 9B are schematic diagrams of basic operation in the first exemplary embodiment.
Figure 9B:
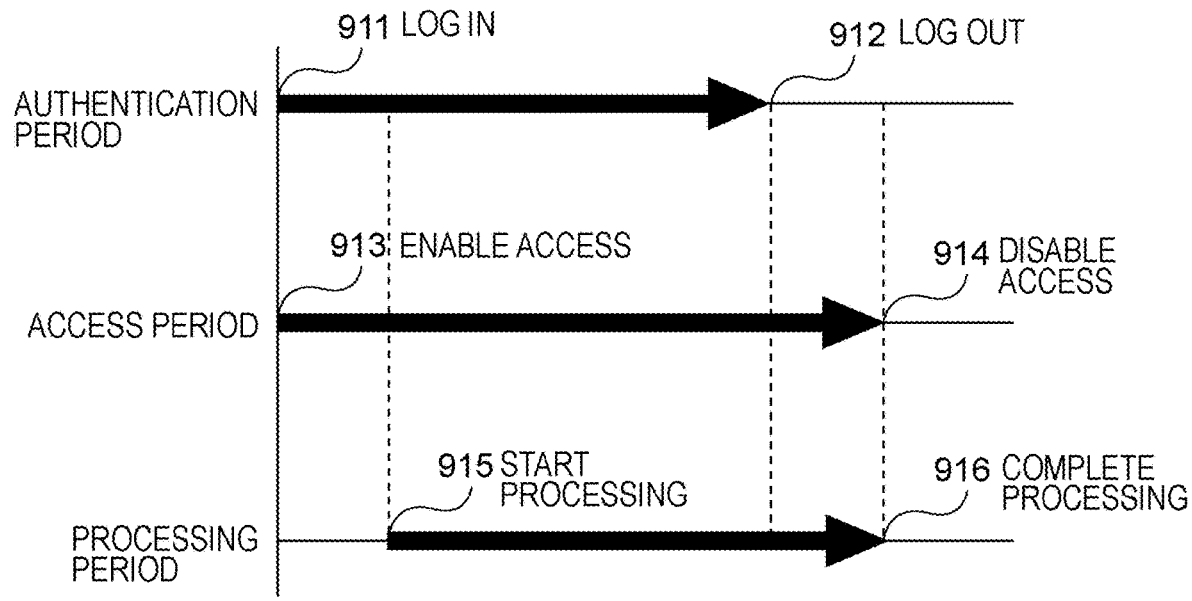

FIGS. 9A and 9B schematically show timing of log-in and log-off, enabling and disabling access, and starting and completing data processing. The abscissa represents time. In the known art, after the user logs in the multi functional printer 101 at a point 901 and the CPU 201 starts to access an external device using identification information that is used when the user logs in the multi functional printer 101 at a point 903, data processing is started at a point 905, as shown in FIG. 9A. However, the user may log out of the multi functional printer 101 by pressing the ID key 341 at a point 902 when data processing is not completed. In this case, access to the external device is disabled at a point 904 when the user logs out of the multi functional printer 101, and thus ongoing data processing is aborted at a point 906.

On the other hand, in the first exemplary embodiment, even after the user logs out of the multi functional printer 101 by pressing the ID key 341 at a point 912, access to the external device is kept until data processing is completed at a point 916, and when data processing is completed at the point 916, access to the external device is disabled at a point 914, as shown in FIG. 9B. Thus, even when the user logs out of the multi functional printer 101 during data processing, data processing is to be completed without being aborted. Moreover, the user can log out of the multi functional printer 101 before data processing is completed. That is to say, even when the user does not attend the multi functional printer 101 during data processing, operation by another user can be prevented while the user is logging in the multi functional printer 101.

The term "log in" means that the user is authenticated to be put in a status in which the user can submit an instruction to perform processing using functions (for example, copy, transmission, and data edit) of the multi functional printer 101. The term "log out" means that the user is put in a status in which the user cannot submit the instruction. The term "access period" represents a period between the time when access to a storage area associated with the user via the LAN 221 is enabled and the time when the access is disabled, during which the access is kept. The term "enable access" means that the multi functional printer 101 is put in a status in which communication between a storage area to be accessed and the multi functional printer 101 is enabled, and data can be written to and read from the storage area. The term "disable access" means shutting down communication between the CPU 201 and an external device. FIG. 9B is different from FIG. 9A in that, even when the user logs out of the multi functional printer 101, access to an external device is kept in FIG. 9B. In this case, only functions that need to access an external device may be functions that require the user to log in to the multi functional printer 101.

FIG. 10 shows a screen that appears on the LCD unit 310 during a period between the time when the user logs out of the multi functional printer 101 at the point 912 and the time when data processing is completed at the point 916 in FIG. 9B. In the first exemplary embodiment, when access to a storage area is kept after the user logs out of the multi functional printer 101, another user is prohibited from logging in the multi functional printer 101 until the access is disabled. Thus, different users can be prevented from accessing the same storage area at the same time, or a new user can be prevented from accessing a storage area that can be accessed by a preceding user by a simplified process.

A progress bar 1001 is displayed on the LCD unit 310 to show approximately when ongoing data processing is completed, i.e., when another user can log in the multi functional printer 101. Moreover, when the other user attempts to log in to the multi functional printer 101, a warning may be displayed, which states that the other user cannot log in the multi functional printer 101 because access to a storage area is kept for data processing. In this arrangement, the other user can quickly know the reason why they cannot log in the multi functional printer 101 and when they can log in the multi functional printer 101. Moreover, an arrangement may be adopted, in which identification information or a user ID and a corresponding personal identification number are accepted, and when the other user is put in a status in which the other user can log in to the multi functional printer 101, reserved log-in is executed, in which the other user is automatically caused to log in to the multi functional printer 101. When reserved log-in is adopted, the other user can utilize time during which the other user waits to operate the multi functional printer 101. Moreover, offline log-in may be adopted, in which the other user can perform functions other than the box function. When offline log-in is adopted, the other user can use offline functions that do not depend on storage areas associated with individual users, for example, the copy, send/facsimile, and remote scanner functions, before ongoing data processing is completed.

Figure 11:
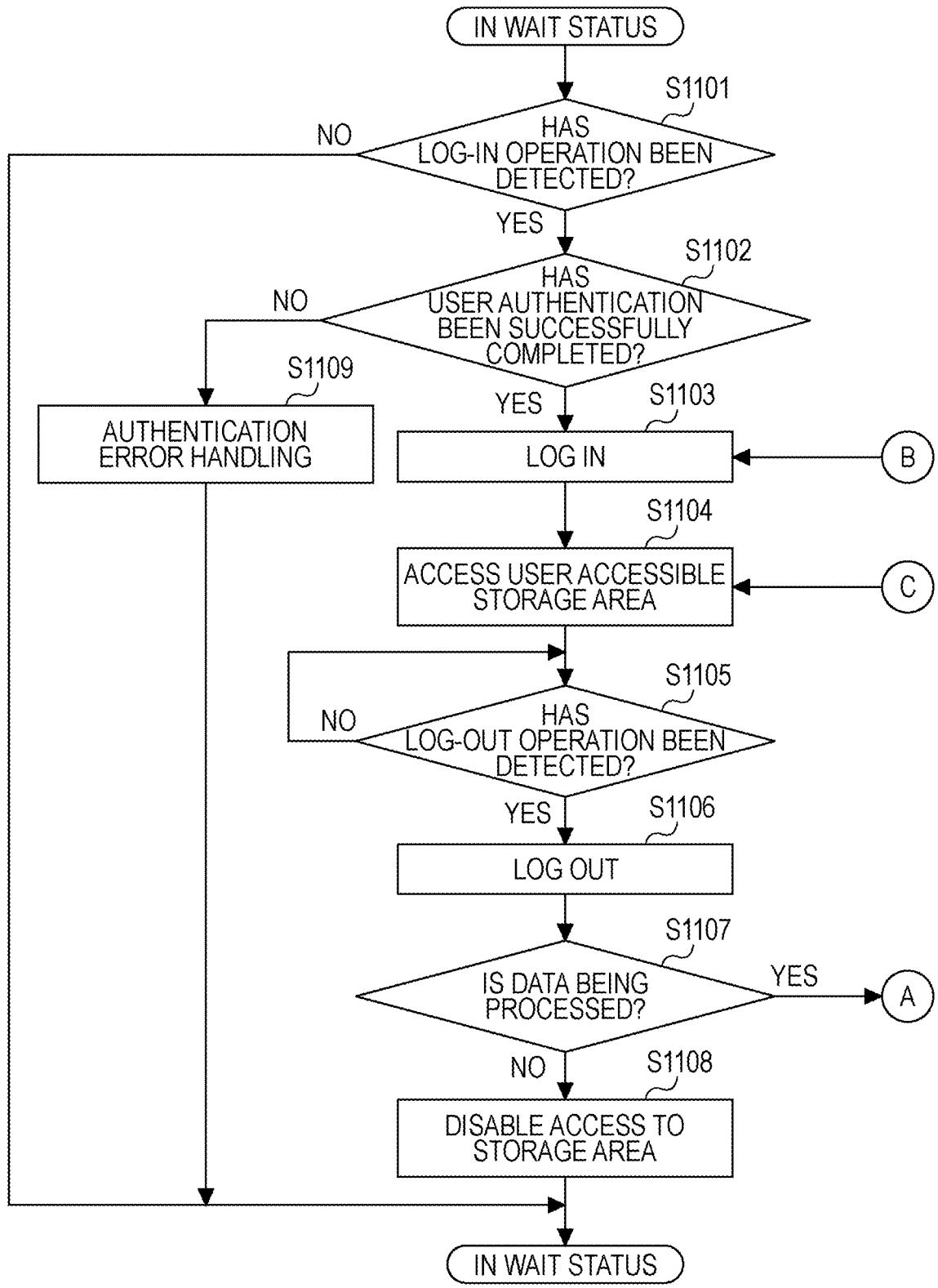
FIG. 11 is the first half of a flowchart of the operation in the first exemplary embodiment.
Figure 12:
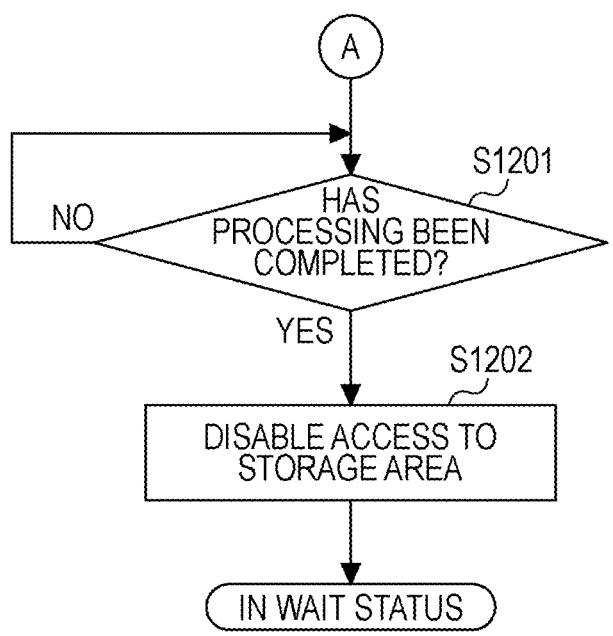
FIG. 12 is the second half of the flowchart of the operation in the first exemplary embodiment.

FIGS. 11 and 12 are parts of a flowchart of the operation in the first exemplary embodiment, which is controlled by the CPU 201. In a wait status in which no log-in user exists, in step S1101, it is first determined whether log-in operation by a user has been detected. When it is determined that log-in operation by the user has been detected, the process proceeds to step S1102 where user authentication is performed on the user authentication screen to determine whether user authentication has been successfully completed.

When it is determined that user authentication has been successfully completed, the process proceeds to step S1103 where the authenticated user is caused to log in to the multi functional printer 101. Otherwise, the process proceeds to step S1109 where authentication error handling is performed, in which, for example, a message stating that user authentication has failed is displayed on the operation unit 230. Then, the status returns to a wait status.

After the user logs into the multi functional printer 101 in step S1103, in step S1104, on the basis of information for identifying an accessible storage area assigned to the log-in user (the table shown in FIG. 16 is referred to), the accessible storage area is accessed. In this status, the user can submit an instruction to perform data processing using the accessed storage area. Then, in step S1105, the CPU 201 starts to monitor log-out operation by the user. When a log-out operation by the user has been detected, the process proceeds to step S1106 where the user is caused to log out of the multi functional printer 101.

In this case, the log-out operation is performed by the user pressing the ID key 341. Alternatively, another method may be adopted. For example, in a case where an IC card is used, when the IC card is pulled out, the user is caused to log out of the multi functional printer 101. As a further alternative, when a predetermined period of time has elapsed after the last user operation or when an infrared sensor has detected that the user leaves the multi functional printer 101, the user may be automatically caused to log out of the multi functional printer 101.

After S1106, in step S1107, it is determined whether data processing is ongoing. When it is determined that data processing is ongoing, the process proceeds to step S1201 in FIG. 12. Otherwise, the process proceeds to step S1108 where access to the storage area is disabled (communication is terminated). Then, the status returns to a wait status.

In this case, assumed ongoing data processing includes only data processing related to the box function shown in FIGS. 7 and 8 using an external storage area, for example, data processing in which data stored in an external storage area is moved to another storage area included in a storage area that can be accessed by a log-in user, or data processing in which data read by the scanner 240 is stored in an external storage area. In other words, the assumed ongoing data processing does not include data processing in which an external storage area is not used, for example, a local copy job in which the scanner 240 and the printer 250 are used, or an e-mail transmission job in which an e-mail message is sent to a mail server that is a storage device irrelevant to the box function. Thus, even when it is determined in step S1107 that these types of data processing are ongoing, the process proceeds to step S1108. However, regardless of whether the external storage area is used, access to the external storage area may be kept when at least one type of data processing related to the logged-in user is ongoing.

In step S1201 in FIG. 12, it is determined whether ongoing data processing has been completed. When it is determined that ongoing data processing has been completed, the process proceeds to step S1202 where access to the storage area is disabled. Then, the status returns to a wait status. During a period between steps S1106 and S1202, another user is prohibited from logging into the multi functional printer 101, as described above (or the other user is prohibited from using the box function even when the other user is allowed to log into the multi functional printer 101).

In the first exemplary embodiment, when data processing is performed using an external storage area, a logged-in user can log out of the multi functional printer 101 to leave the multi functional printer 101 before the data processing is completed. Thus, the efficiency of the user's operation can be improved. Moreover, even when the user logs out of the multi functional printer 101, an operation screen like that shown in FIG. 10 is displayed. Thus, security can be ensured because another user cannot operate the external storage area while access to the external storage area is kept.

Second Exemplary Embodiment

A second exemplary embodiment according to the present invention will now be described. The description of components similar to those in the first exemplary embodiment is omitted here. The second exemplary embodiment is different from the first exemplary embodiment in that, after a user logs out of the multi functional printer 101 in step S1106 in FIG. 11, a notification is sent when data processing has been completed, and data processing is cancelled and access to a storage area is disabled when a data processing error has occurred.

Figure 13:
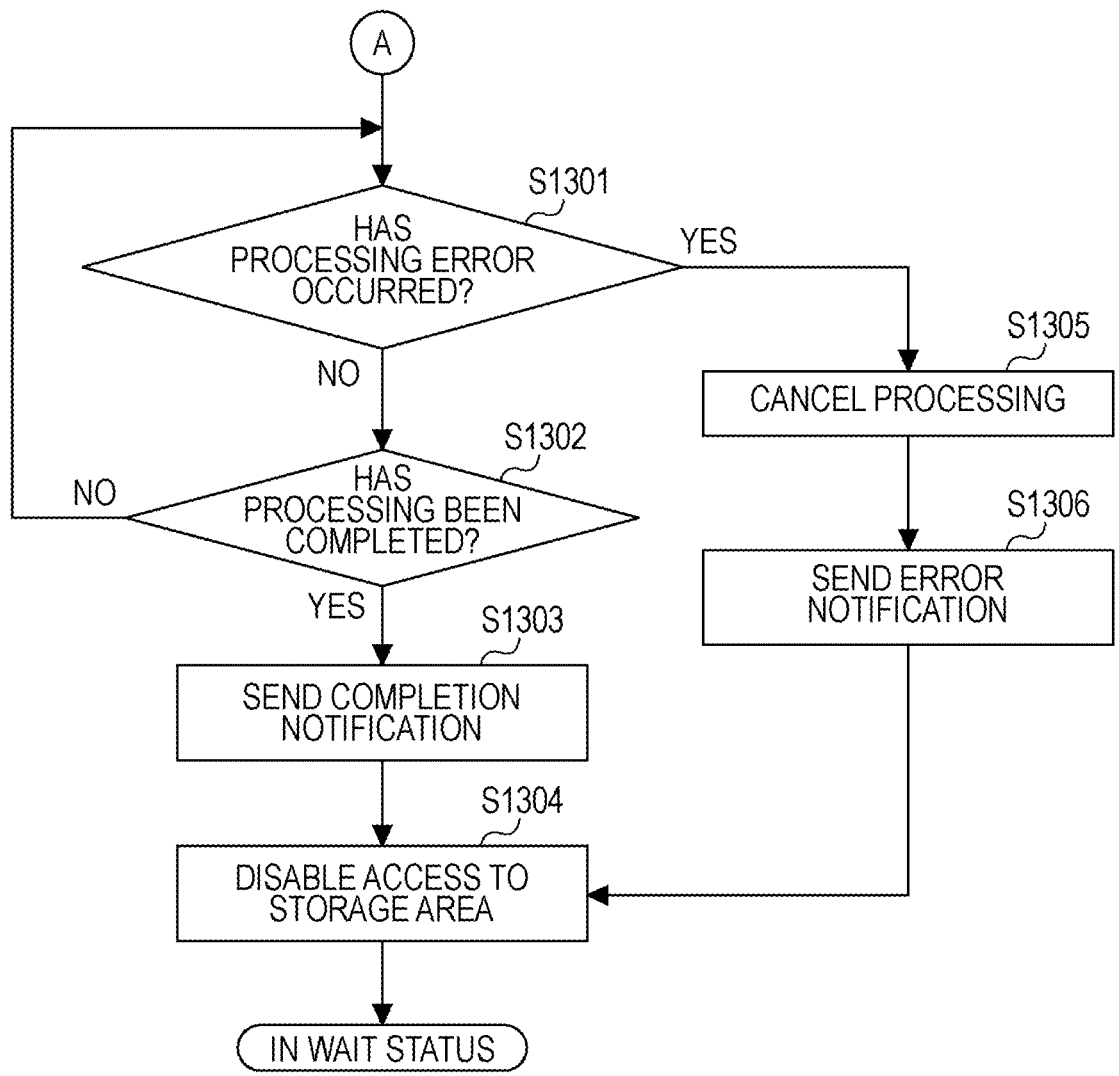
FIG. 13 is the second half of a flowchart of the operation in a second exemplary embodiment.

FIG. 13 is the second half of a flowchart of the operation in the second exemplary embodiment, which is controlled by the CPU 201. When it is determined in step S1107 in FIG. 11 that data processing is ongoing, the process proceeds to step S1301. In step S1301, a data processing error is monitored during data processing. A data processing error includes, for example, an error in which data stored in one storage area cannot be moved to another storage area due to shortage of an available area in the other storage area and an error in which a paper jam or a network failure occurs when data read by the scanner 240 is stored in an external storage area.

When data processing has been completed without an error, the process proceeds to step S1303 where a notification is sent to a nominated contact point, which states that data processing has been completed without an error. Thus, even when the user logs out of and leaves the multi functional printer 101 during user-designated data processing, the user can be notified that the user-designated data processing has been completed. Then, in step S1304, access to the user accessible storage area is disabled, and the status returns to a wait status.

On the other hand, when an error has been detected in step S1301, the process proceeds to step S1305. In step S1305, data processing in which an error has occurred is cancelled. Then, in step S1306, a notification is sent to the user, which states that an error has occurred. Thus, the user, who logged out of the multi functional printer 101, can be notified that the user-designated data processing has not been successfully completed due to an error. Then, the process proceeds to step S1304. In this case, an arrangement is provided for registering in advance an e-mail address as a contact point to which a notification is sent for each user. In this arrangement, the user can specify a contact point by the log-in operation. The user may specify a contact point from the operation unit 230 after the log-in operation.

In the second exemplary embodiment, even when a user logs out of the multi functional printer 101 during user-designated data processing in which an external storage area is used, the user can be readily notified whether the user-designated data processing has been normally completed. Moreover, even when an error has occurred during the user-designated data processing, the data processing is automatically cancelled, and the status returns to a wait status. In this status, the next user can use the multi functional printer 101.

Third Exemplary Embodiment

A third exemplary embodiment according to the present invention will now be described. The description of components similar to those in the first exemplary embodiment is omitted here. The third exemplary embodiment is different from the first exemplary embodiment in that, in a case where access to a storage area accessible by a preceding user is kept though the preceding user logs out of the multi functional printer 101, another user is allowed to log in to the multi functional printer 101 when the same accessible storage area is assigned to the preceding user and the other user.

Figure 14:
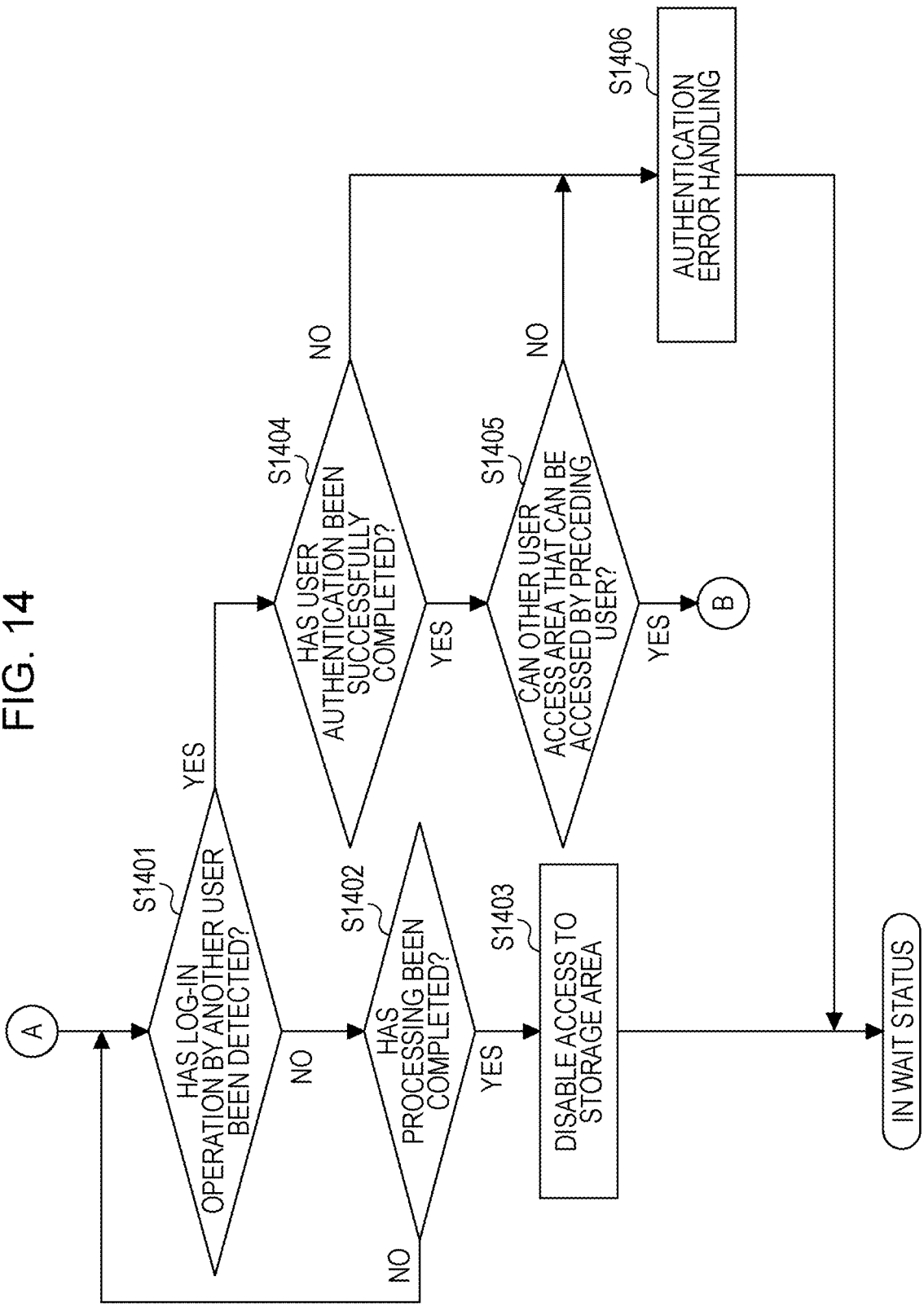
FIG. 14 is the second half of a flowchart of the operation in a third exemplary embodiment.

FIG. 14 is the second half of a flowchart of the operation in the third exemplary embodiment, which is controlled by the CPU 201. When it is determined in step S1107 in FIG. 11 that data processing is ongoing, the process proceeds to step S1401. In step S1401, it is determined whether a log-in operation by another user has been detected during the data processing. Log-in operation means, for example, pressing the ID key 341 after entering a user ID and a corresponding personal identification number on the log-in screen shown in FIG. 4.

When it is determined that a log-in operation by another user has not been detected during the data processing, access to a storage area accessible by the preceding user is disabled in step S1403 upon completion of the data processing, and the status returns to a wait status. On the other hand, when it is determined that a log-in operation by another user has been detected during the data processing, the process proceeds to step S1404, and user authentication is performed on the other user. In step S1404, it is determined whether user authentication has been successfully completed. When it is determined that user authentication has been successfully completed, the process proceeds to step S1405. Otherwise, the process proceeds to step S1406 where authentication error handling is performed, in which, for example, a message stating that user authentication has failed is displayed, and the status returns to a wait status. In step S1405, it is determined whether the same accessible storage area is assigned to the preceding user and the other user, who has been authenticated. In this case, a fact that the same accessible storage area is assigned to the preceding user and the other user means that, for example, the same accessible storage areas set in the devices LOCAL, DeviceA, DeviceB, and DeviceC are assigned to the user 0123 and a user 0124 in FIG. 16. When it is determined that the same accessible storage area is assigned to the preceding user and the other user, the process proceeds to step S1103 where the other user is allowed to log in to the multi functional printer 101. Otherwise, the process proceeds to step S1406, and the status returns to a wait status.

In the third exemplary embodiment, when a preceding user logs out of the multi functional printer 101 during data processing involving an external storage area, another user is allowed to log in the multi functional printer 101 when the same accessible storage area is assigned to the preceding user and the other user. Thus, for example, when the preceding user, who logged out of the multi functional printer 101, needs to log in to the multi functional printer 101 again or when yet another user who has the same authority as the preceding user needs to log in to the multi functional printer 101, they need not wait to log in to the multi functional printer 101.

Fourth Exemplary Embodiment

A fourth exemplary embodiment according to the present invention will now be described. The description of components similar to those in the first exemplary embodiment is omitted here. The fourth exemplary embodiment is different from the first exemplary embodiment in that, in a case where access to a storage area accessible by a preceding user is kept though the preceding user logs out of the multi functional printer 101, another user can submit an instruction to perform functions that do not require an external storage area. The operation is similar to that of offline log-in shown in the first exemplary embodiment. However, the operation in the fourth exemplary embodiment is different from offline log-in, in that when data processing designated by the preceding user has been completed, access to an external storage area is enabled, the external storage area being associated with the other user logging in to the multi functional printer 101.

Figure 15:
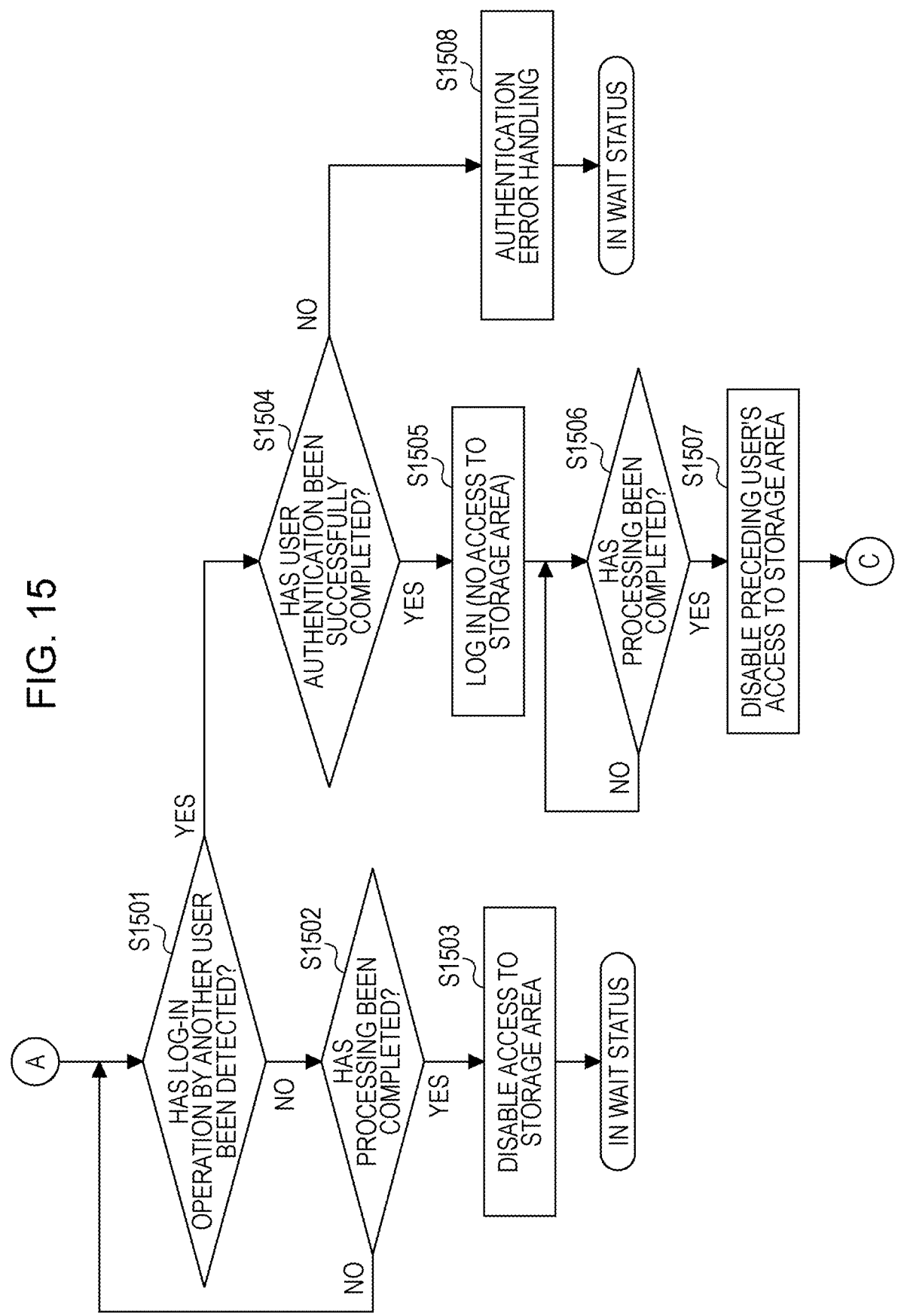
FIG. 15 is the second half of a flowchart of the operation in a fourth exemplary embodiment.

FIG. 15 is the second half of a flowchart of the operation in the fourth exemplary embodiment, which is controlled by the CPU 201. When it is determined in step S1107 in FIG. 11 that data processing is ongoing, the process proceeds to step S1501. In step S1501, it is determined whether a log-in operation by another user has been detected during the data processing.

When it is determined that a log-in operation by another user has not been detected during the data processing, access to a storage area accessible by the preceding user is disabled in step S1503 upon completion of the data processing, and the status returns to a wait status. On the other hand, when it is determined that a log-in operation by another user has been detected during the data processing, the process proceeds to step S1504, and user authentication is performed on the other user. In step S1504, it is determined whether user authentication has been successfully completed. When it is determined that user authentication has not been successfully completed, the process proceeds to step S1508 where authentication error handling is performed, in which, for example, a message stating that user authentication has failed is displayed on the operation unit 230, and the status returns to a wait status.

On the other hand, when it is determined that user authentication has been successfully completed, the process proceeds to step S1505 where the other user, who has been authenticated, is caused to log in to the multi functional printer 101. However, at this point, access to the storage area accessible by the preceding user is kept. Thus, the other user, who has logged in the multi functional printer 101, cannot submit an instruction to perform data processing in which an external storage area is used. That is to say, the other user is permitted to use only functions, for example, a local copy function and an e-mail transmission function, other than the box function. At this point, it is convenient that a message is displayed on the screen of the operation unit 230, which states that the external storage area cannot be accessed because the preceding user's access is kept.

Subsequently, in step S1506, it is determined whether the data processing designated by the preceding user has been completed, in which an external storage area is used. When it is determined that the data processing has been completed, the process proceeds to step S1507 where the preceding user's access to the storage area is disabled. Then, in step S1104 in FIG. 11, access to a storage area accessible by the other user is enabled on the basis of information on the storage area.

In the fourth exemplary embodiment, when a preceding user logs out of the multi functional printer 101 during data processing in which an external storage area is used, another user can perform operations other than operations related to data processing in which an external storage area is used until the data processing designated by the preceding user is completed. Thus, the operating efficiency can be improved.

While the first to fourth exemplary embodiments according to the present invention have been described, the present invention is not limited to these exemplary embodiments. For example, user authentication may not be necessary to execute jobs, for example, a local copy job or a transmission job, other than jobs related to data processing in which an external storage area is used.

Moreover, regarding a storage area that is freely accessible, even when one user's access to the storage area is kept, another user may display or use the storage area. The storage area may be used without user authentication.

In the foregoing exemplary embodiments, at the same time a user is authenticated and logs in to the multi functional printer 101, access to a storage area accessible by the user is enabled. Access to the storage area may be enabled at a predetermined point in time other than a point in time when the user logs in to the multi functional printer 101. Specifically, access to the storage area may be enabled when the box main screen shown in FIG. 7 is opened or when a predetermined operation is performed while the box main screen is being displayed. Thus, when an operation involving an external storage area is not performed, access to the external storage area is disabled, thereby reducing network traffic.

Moreover, in the foregoing exemplary embodiments, when user authentication is performed, a user ID for identifying a user is used. However, the ID used for user authentication is not limited to an ID corresponding to each user. Alternatively, a group ID set for each group or a section ID set for each section may be used.

Moreover, in the foregoing exemplary embodiments, a storage area on the network associated with a logged-in user is accessed with reference to the table shown in FIG. 16 provided in the authentication server 104 or the multi functional printer 101. Alternatively, another method may be adopted. For example, access rights to boxes, folders, and the like may be controlled by individual storage devices on the network. In this case, the multi functional printer 101 may send a user ID input from the operation unit 230 to individual storage devices via the network and obtain information on storage areas accessible by the user ID and information on files stored in the storage areas from the individual storage devices.

The present invention may be applied to a system that includes a plurality of units (for example, a host computer, an interface unit, a reader, a printer, and a file server) or a device that includes a single unit (for example, a network multi functional printer).

The present invention is also achieved by an embodiment in which a storage medium (or a recording medium) that stores program code of software that performs the functions according to the foregoing exemplary embodiments is provided to a system or a device, and a computer (or a CPU or a micro processing unit (MPU)) included in the system or the device reads and executes the program code stored in the storage medium. In this case, the program code read from the storage medium performs the functions according to the foregoing exemplary embodiments, and thus the present invention includes the computer program and the storage medium, which stores the program code. An operating system (OS) operating on a computer may execute some or all of the actual processing to perform the functions of the foregoing exemplary embodiments according to instructions from the program code.

Moreover, the program code read from the storage medium may be written to a memory included in, for example, a function expansion card inserted in a computer or a function expansion unit connected to a computer. Then, for example, a CPU included in the function expansion card, the function expansion unit, or the like may execute some or all of the actual processing to perform the functions of the foregoing exemplary embodiments according to instructions from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A scanning apparatus to communicate with a server via a network, the scanning apparatus comprising:
    a scanner configured to scan an original document to generate image data;
    an interface configured to receive identification information from a user;
    a network interface configured to transmit the identification information received by the interface to the server;
    a processor configured to perform, based on a result of authentication by the server utilizing the identification information, login processing for causing the user to be logged into the scanning apparatus; and
    a display,
    wherein the network interface receives, from the server, destination information which specifies an external storage destination which is different from the server and is set to be accessible by the scanning apparatus based on the identification information, and
    wherein the display is configured to display as a storage destination to store the generated image data, the external storage destination specified by the destination information and a box which is in the scanning apparatus without displaying a second storage destination which is not set to be accessible based on the identification information.

2. The scanning apparatus according to claim 1, further comprising a printer that performs printing.

3. The scanning apparatus according to claim 1, wherein the interface is configured to receive a log-out instruction to cause the user to be logged out of the scanning apparatus from the user.

4. The scanning apparatus according to claim 1, wherein the display displays a screen for allowing the user to input the identification information.

5. The scanning apparatus according to claim 1, wherein the interface is a card reader that receives the identification information from a card.

6. The scanning apparatus according to claim 1, wherein the identification information includes at least one of the following: a user identification (ID), a group ID, a personal identification number, and a password.

7. A method for controlling a scanning apparatus to communicate with a server via a network, wherein the scanning apparatus includes a scanner configured to scan an original document to generate image data, an interface, a network interface, a processor, and a display, the method comprising:
  receiving, via the interface, identification information from a user;
  transmitting, via the network interface, the identification information received by the interface to the server;
  performing, via the processor and based on a result of authentication by the server utilizing the identification information, login processing for causing the user to be logged into the scanning apparatus; and
  displaying on a screen of the display,
  wherein the network interface receives, from the server, destination information which specifies an external storage destination which is different from the server and is set to be accessible by the scanning apparatus based on the identification information, and
  wherein displaying on the screen of the display includes displaying, as a storage destination to store the generated image data, the external storage destination specified by the destination information and a box which is in the scanning apparatus without displaying a second storage destination which is not set to be accessible based on the identification information.

8. A non-transitory storage medium storing a program to cause a computer to perform a method for controlling a scanning apparatus to communicate with a server via a network, wherein the scanning apparatus includes a scanner configured to scan an original document to generate image data, an interface, a network interface, a processor, and a display, the method comprising:
  receiving, via the interface, identification information from a user;
  transmitting, via the network interface, the identification information received by the interface to the server;
  performing, via the processor and based on a result of authentication by the server utilizing the identification information, login processing for causing the user to be logged into the scanning apparatus; and
  displaying on a screen of the display,
  wherein the network interface receives, from the server, destination information which specifies an external storage destination which is different from the server and is set to be accessible by the scanning apparatus based on the identification information, and
  wherein displaying on the screen of the display includes displaying, as a storage destination to store the generated image data, the external storage destination specified by the destination information and a box which is in the scanning apparatus without displaying a second storage destination which is not set to be accessible based on the identification information.

9. The scanning apparatus according to claim 1, wherein, in a case where the server authenticates the user utilizing the identification information, the processor performs processing to log the user into the scanning apparatus.

10. The scanning apparatus according to claim 1, wherein the network interface receives, from the server, information which (i) specifies, from among a plurality of storage destinations, the storage destination specified by the destination information transmitted by the network interface and (ii) specifies a storage destination which is not set to be accessible based on the identification information transmitted by the network interface.

11. The scanning apparatus according to claim 1, wherein a copy tab is configured to be displayed in a screen, and the copy tab is a tab for causing the display to display a copy screen.

12. The scanning apparatus according to claim 1, wherein a facsimile transmission tab is displayed in a screen, and the facsimile transmission tab is a tab for causing the display to display a facsimile transmission screen.

13. The scanning apparatus according to claim 1, wherein file information of at least one file is stored in the storage destination specified by the destination information.

14. The scanning apparatus according to claim 1, wherein the display is configured to display, as the storage destination of the generated image data, the box which is in the scanning apparatus without displaying the storage destination which is set to be accessible based on the identification information transmitted by the network interface.

15. The scanning apparatus according to claim 14, wherein, when the user instructs preview of data stored in the box, the display further performs the preview of the data stored in the box.

16. The scanning apparatus according to claim 15, wherein the display further displays at least one file stored in the storage destination specified by the destination information.

17. The scanning apparatus according to claim 1, wherein the interface further receives scanning setting regarding scan of the original document by the scanner.

18. The scanning apparatus according to claim 17, wherein the scanning setting is a scanning resolution.

19. The scanning apparatus according to claim 1,
  wherein the processor causes the user to be logged out from the scanning apparatus even if transmission of the image data by the network interface is not completed, and
  wherein, in a case where the processor causes the user to be logged out from the scanning apparatus while transmission of the image data is being performed, the network interface continues the transmission of the image data and completes the transmission of the image data.

20. The scanning apparatus according to claim 1, wherein the specified external storage destination is two or more storage destinations specified by the destination information from among a plurality of storage destinations.

* * * * *